Patented Mar. 31, 1953

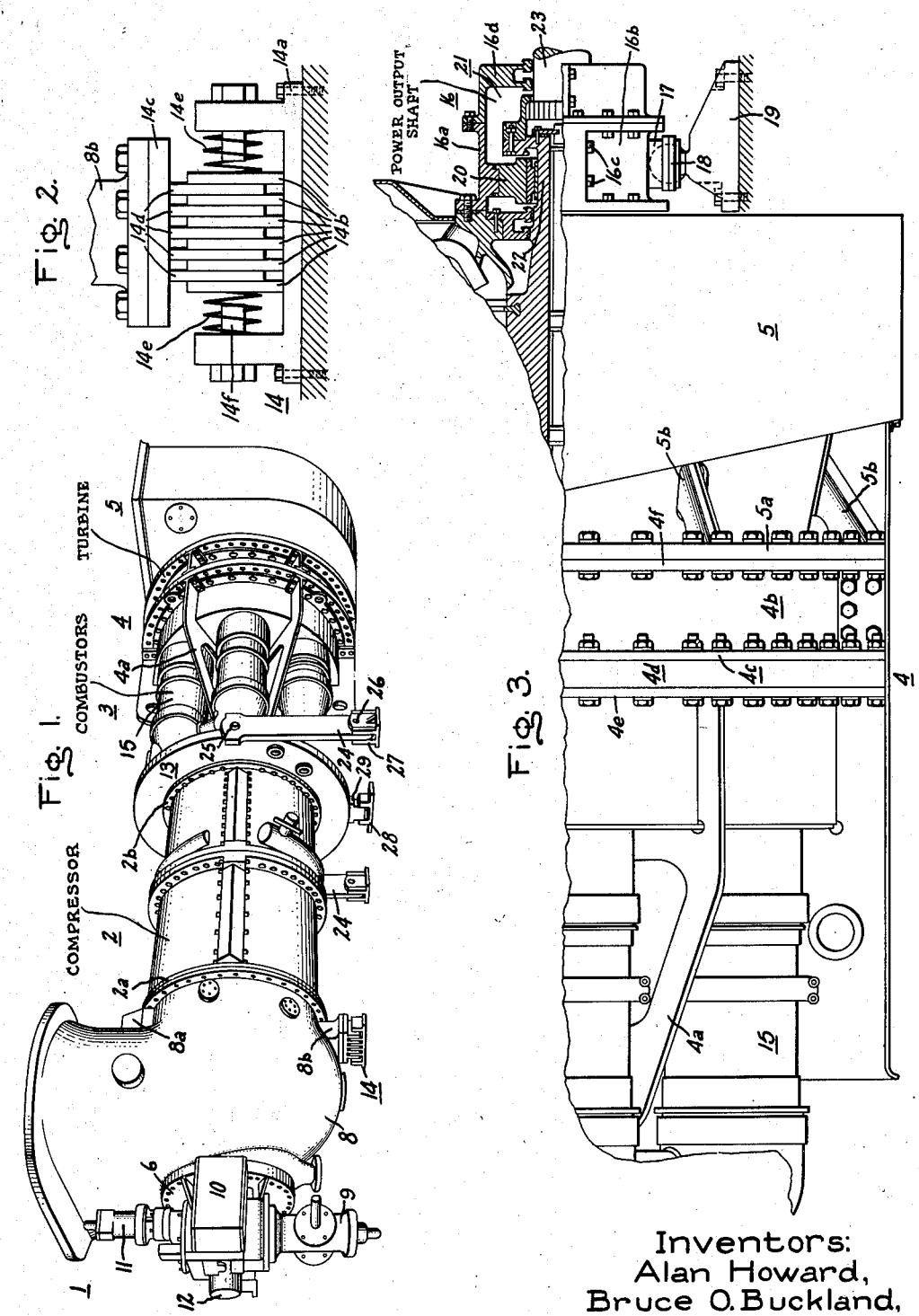

2,632,997

UNITED STATES PATENT OFFICE 2,632,997

SUPPORTING ARRANGEMENT FOR SELF-CONTAINED GAS TURBINE POWER PLANT HAVING INTEGRAL FRAMES

Alan Howard and Bruce O. Buckland, Schenectady, N. Y., assignors to General Electric Company, a corporation of New York Original application June 11, 1947, Serial No. 754,002. Divided and this application February 1, 1951, Serial No. 208,962

3 Claims. (Cl. 60—39.31)

This invention relates to gas turbine type thermal power plants, particularly to means for supporting an integral gas turbine power plant on a bed or foundation in such a manner that the high temperature components of the power plant may expand and contract freely as their temperature changes, without setting up excessive stresses therein or impairing the bearing alignment. The invention is particularly adapted for supporting a thermal power plant of the type described on a comparatively flexible foundation such as the chassis of a locomotive.

This application is a division of Serial No. 754,002, filed June 11, 1947, in the names of Alan Howard, Chester S. Rice and Bruce O. Buckland, and assigned to the same assignee as the present application.

In the design of gas turbine power plants, a major consideration is the provision of arrangements for permitting free differential thermal expansion between various parts without producing undesirable deformation or deterioration of the bearing alignment in machines of sufficient axial length to require three or more axially spaced bearings for the rotor. Because of the extremely high temperatures to which certain parts of the power plant are subjected, it is necessary to use special high temperature resisting materials, such as various known stainless steels. These materials generally have a coefficient of thermal expansion in the neighborhood of twice that of ordinary mild steel, with the result that use of them magnifies the problems resulting from thermal expansion. Furthermore, in a power plant designed for application where the load must be frequently and materially altered as, for instance, in marine installations and locomotives, it is found that thermal expansion problems are intensified still further by differences in the size and mass of various related parts, and differences in the resistance of the heat flow paths to them from the source of heat, with accompanying differences in the rate of change of dimension when temperature changes rapidly. These factors make it particularly difficult to maintain the accurate alignment required for the rotor bearings. Formerly, the accepted method of insuring bearing alignment was to secure each component of the power plant to an external bed or base member, which was made sufficiently rigid to resist deformation by any external forces which might be applied to it in a marine or locomotive installation.

We have found that it is most desirable to provide a gas turbine power plant with a "self-supporting" frame comprising various casing members firmly secured together and suitably braced so as to need no external supporting bed to insure bearing alignment.

Accordingly, the object of the invention is to provide improved means for supporting an integral gas turbine power plant in such a manner that it is fixed at only one point relative to a supporting bed, being free to expand axially from that point, and having suitable means at a location near the center of gravity for supporting the weight of the plant, with auxiliary means for constraining the machine against transverse displacement and certain vibration displacements.

Other objects and advantages will become apparent from the following description taken in connection with the accompanying drawing, in which Fig. 1 is a perspective exterior view of a complete gas turbine power plant supported in accordance with the invention; Fig. 2 is a detail view of the auxiliary vibration dampener for the compressor end of the plant; and Fig. 3 is a detail view of the combustor and turbine casing assembly, partly in section, to illustrate supporting details not visible in Fig. 1.

Generally, this novel supporting means comprises a universal support adapted to fix the end of the power plant adjacent the rotor connection to the load output device, second weight supporting means including a pair of vertically disposed links having upper end portions connected to trunnions located at a horizontal plane substantially at the middle of the power plant and adjacent the center of gravity thereof so that the power plant is free to expand longitudinally from the universal support as the operating temperature changes. Auxiliary means cooperate with the vertical links to prevent transverse displacement of the power plant, and a vibration damper restrains vibrational movement of the overhung end of the power plant, while permitting axial and certain transverse displacements in accordance with temperature changes or with distortions of the foundation without setting up excessive stresses in the power plant frame.

Referring now more particularly to Fig. 1, the power plant includes an accessory assembly indicated generally at 1, an axial flow compressor indicated generally at 2, a combustion system 3, a turbine assembly 4, and an exhaust casing 5. The accessory section includes a casing 6 adapted to be bolted to the exterior end of the compressor inlet casing 8. Casing 6 supports a plurality of power plant accessories, for instance, a fuel pump 9, a fuel regulator 10, a speed governor 11, and a tachometer generator 12. These accessories are adapted to be driven by suitable gearing (not shown) contained within the casing and provided with a single power input shaft coupled to the turbine-compressor rotor.

It will be observed from Fig. 1 that the axial flow compressor casing 2 is of substantial axial length, having a first end flange 2a bolted to a cooperating flange of the inlet casing 8, and a second end flange 2b bolted to a comparatively heavy main frame ring 13. Formed integral with the top outer wall of the inlet casing 8 is a boss 8a to which may be secured a "lifting eye" (not shown) for convenience in handling the compressor or the complete power plant. At the bottom of casing 8 is a second boss 8b adapted to be connected to a vibration damping fixture 14, the construction and purpose of which will be more fully described hereinafter.

The framework for the turbine casing 4 includes a plurality of circumferentially spaced brace members 4a which assist in rigidly supporting the turbine casing relative to the compressor 2. As will be apparent from Fig. 1, the braces 4a are disposed between each pair of adjacent combustors 15, six of which are spaced circumferentially around the power plant between the compressor casing and the turbine casing.

Referring now to Fig. 3, the turbine frame assembly includes a turbine casing 4b having a first end flange 4c bolted to a main frame ring 4d and another flange member 4e, the latter being in turn welded to the brace members 4a. Casing 4b has a second end flange 4f bolted to the exhaust casing flange 5a. The exhaust casing assembly includes a plurality of circumferentially spaced struts or braces 5b projecting inwardly through the exhaust hood so that the end bearing housing 16 is rigidly supported by the braces 5b from the flange 5a.

The bearing housing 16 consists of upper and lower halves 16a, 16b, divided along a horizontal plane and secured together by bolts 16c. The lower half 16b is provided with a projecting boss 17 forming a socket for a ball member 18, which is in turn secured to or formed integral with a fixed end support pedestal 19. It will be understood that this ball-socket arrangement provides one support point for the power plant which is fixed in three dimensions, but does not resist limited rotational displacement of the machine about its longitudinal axis relative to the foundation of the machine. The end of bearing housing 16 is closed by a cap member 16d, which may also be formed in two halves and bolted together.

In addition to the end bearing 20, the casing 16 contains a suitable splined coupling arrangement 21 for connecting the end 22 of the turbine rotor with the load output shaft 23. The details of this bearing and coupling arrangement are not necessary to an understanding of the present invention, being more fully disclosed in the copending application of Bruce O. Buckland and Chester S. Rice, Serial No. 208,961 filed February 1, 1951, and assigned to the same assignee as the present application.

Reference is now made to Fig. 1 for an illustration of the main weight supporting means for the power plant. This comprises a pair of vertical transversely spaced struts 24, located approximately adjacent the center of gravity of the plant with their upper ends pivoted at 25 to diametrically opposite points on the main frame ring 13. At their lower ends, struts 24 are carried on pivots 26, held in U-shaped fixtures 27 suitably secured to the bed of the power plant. A fourth point of constraint is provided by a U-shaped fixture 28 secured to the power plant bed and defining a space into which projects a lug 29 on the lowermost point of the support flange 13. As will be obvious from Fig. 1, the block 29 has parallel flat side surfaces free to slide either longitudinally or vertically in the channel fitting 28, but is adapted to resist transverse displacement of the machine relative to the foundation.

From the above it will be seen that the complete power plant is carried at three points, one (ball 18) fixed relative to the bed of the machine, two (pivots 25) being free to move longitudinally and transversely but are constrained by links 24 in a vertical direction relative to the bed of the machine, while a fourth point (lug 29) is free to move either vertically or longitudinally but is adapted to prevent sidewise displacement relative to the bed. Thus, there is provided a mounting arrangement which is extremely simple mechanically, yet furnishes adequate support while permitting appreciable longitudinal expansion of the power plant as the operating temperature changes. The arrangement is particularly well adapted for supporting a gas turbine power plant on a portable foundation such as the frame of a locomotive, which is not completely rigid but subject during operation to certain transverse, longitudinal, and torsional loads which tend to cause some flexure of the power plant bed. With this improved mounting arrangement, such distortions may occur in the bed without transmitting excessive forces to the frame and casing assembly of the power plant.

It will be seen that the above-described three-point support for the power plant leaves the compressor 2 and accessories assembly 1 supported in overhung relation with respect to the main frame ring 13. Because of the weight of these overhung components, and the considerable axial length of the compressor, there may be some tendency for this overhung mass to vibrate, particularly when the power plant is installed in a locomotive, due to rotor unbalance and other causes. To prevent such vibration, a suitable damping device 14 may be provided to cooperate with the boss 8b on the compressor inlet casing, as shown in Fig. 1. The details of one such vibration damping device may be seen in Fig. 2. This comprises a channel-shaped member 14a secured to the bed of the power plant, with a plurality of spaced friction plates 14b welded thereto. Bolted to the compressor casing boss 8b is a fitting 14c having welded thereto a cooperating set of parallel plates 14d. As will be apparent from Fig. 2, these two sets of friction plates 14b, 14c are interleaved and are adapted to be biased into frictional engagement with each other by means of suitable springs, for instance, coil springs 14e interposed between the channel member 14a and the end friction plates. Springs 14e may be supported on suitable pins 14f fixed in the channel member 14a and projecting through the springs but terminating short of the first friction plate. The comparatively thin friction plates 14b, 14d are sufficiently flexible as to be deflected laterally by the springs 14e into frictional engagement with each other.

This frictional engaging force is so adjusted, as by altering the force exerted by springs 14e, that the compressor is held quite rigidly, but permitted to move, by slippage between the friction plates, to compensate for thermal expansion in a radial or longitudinal direction or under the influence of large and unusual transverse or vertical forces applied by bending or twisting of the locomotive frame. Thus, the damping device is a yielding fourth support point designed to prevent transmission of bending forces to the power plant of more than preselected magnitude.

While only one form of this vibration dampening device has been illustrated, it will be obvious to those skilled in the art that many other known equivalent mechanical or hydraulic vibration damping devices may likewise be employed.

It will be seen that the invention provides a comparatively simple mounting arrangement for a high temperature thermal power plant which readily permits the differential displacements required between the power plant and its supporting bed in accordance with temperature changes in the power plant without imposing excessive stresses, while providing means for rigidly fixing the power plant relative to its foundation at the location of the coupling for connecting the prime mover to the driven machine.

While a preferred embodiment of the invention has been described herein, it will be apparent to those skilled in the art that numerous changes and substitutions of equivalents might be made, and it is desired to cover by the appended claims all such modifications as fall within the true spirit and scope of the invention.

What we claim as new and desire to secure by Letters Patent of the United States is:

1. In a gas turbine power plant including a compressor casing of substantial axial length with a combustion section and a turbine casing arranged coaxial relative to the compressor casing, all three components having rigid integral frame structures secured together to maintain proper alignment of the respective components without the aid of an external frame, supporting means for the power plant including the combination of first support means connected to the extreme exterior end of the turbine casing and including a portion adapted to be secured to a supporting bed and means defining a universal support adapted to constrain the exterior end of the turbine casing against axial, transverse and vertical movements, second support means including a pair of substantially parallel vertical links each having a first end portion adapted to be pivotally secured to a foundation, the other end of said links being pivoted to opposite side portions of the power plant casing substantially at the middle thereof whereby the mid-portion of the power plant casing is constrained against vertical movement but left free to move longitudinally in accordance with thermal changes in the length of the turbine and combustion section, third support means comprising key and keyway defining members including a first portion connected to the lower portion of the power plant casing between said second supporting links and a cooperating member adapted to be secured to the foundation, said third key means being adapted to constrain the mid-portion of the casing against transverse movement while permitting both vertical and axial movement thereof, and vibration damping means connected to the end portion of the compressor casing remote from said second and third supporting means and including abutting friction members secured to the casing and foundation respectively and adapted to yieldingly restrain movement of said casing end portion against transverse and vertical vibration displacements while permitting axial displacement of said casing end portion relative to the foundation in accordance with increasing overall length of the power plant due to thermal changes.

2. In a gas turbine power plant including a compressor section, a combustion section, and a turbine section arranged in coaxial series relation, all three of said components having rigid integral frame structures secured together to maintain proper alignment of the respective components without the aid of external frame structure, means for supporting the power plant including the combination of first support means connected to the extreme exterior end of the turbine section and including a member adapted to be secured to a supporting bed and means defining a ball and socket joint between said bed member and the turbine casing whereby the exterior end of the turbine is constrained against axial, transverse and vertical movements, second support means including a pair of substantially parallel vertical links having first end portions adapted to be secured to the supporting bed of the power plant, the other end of said links being connected to opposite side portions of the power plant casing substantially at the middle thereof whereby said mid-portion of the power plant is constrained against vertical movement but permitted to move longitudinally in accordance with thermal changes in the length of the turbine and combustion section, third support means comprising radial key and keyway defining members including a first member at the lower circumferential portion of the power plant casing between said second links with a cooperating member adapted to be secured to the bed of the machine whereby the mid-portion of the casing is constrained against sidewise movement while permitting both vertical and axial displacement thereof, and frictional vibration damping means connected to the end portion of the compressor casing remote from said second and third supports and including interleaved friction members having every other one secured to the compressor casing while the alternate members are adapted to be secured to the bed of the machine with means biasing said elements into frictional engagement, said friction elements being disposed in substantially radial planes parallel to the axis of the power plant so as to resiliently restrain movement of the compressor casing against transverse and vertical vibration displacements while permitting axial displacement in accordance with changing overall length of the power plant.

3. In a thermal power plant of substantial axial length relative to its diameter and having at least one axially extending rotor shaft of substantial length supported by a plurality of axially spaced bearings and having one end adapted to be coupled to a power consuming machine, the power plant having a rigid integral frame structure adapted to maintain proper alignment of the bearings without the aid of an external frame, the combination of supporting means for the power plant including first means connected to the end of the frame adjacent the power output end of the rotor shaft, said first support means including a portion adapted to be secured to a foundation and means defining a universal support adapted to constrain the end of the frame against axial, transverse and vertical movements, second means for supporting the weight of the power plant including a pair of substantially parallel vertical links each having an end portion adapted to be flexibly secured to the foundation, the other end of said links being pivoted to diametrically opposite portions of the frame substantially adjacent the center of gravity of the power plant whereby said mid-portion is constrained against vertical movement while remaining free to move longitudinally in accordance with thermal changes in the length of the frame between said links and said first universal support, third support means comprising radial key and keyway defining means including a first member on a lower circumferential portion of the power plant casing between said links and a cooperating member adapted to be secured to the foundation of the machine, said key members being adapted to constrain the casing against sidewise movement while permitting both radial and axial movements thereof in accordance with temperature changes.

ALAN HOWARD.
BRUCE O. BUCKLAND.

REFERENCES CITED

The following references are of record in the file of this patent:

UNITED STATES PATENTS

| Number | Name | Date |
|---|---|---|
| 2,187,909 | McGiffert | Jan. 23, 1940 |
| 2,265,612 | Ray | Dec. 9, 1941 |
| 2,443,054 | Putz et al. | June 8, 1948 |
| 2,516,671 | Bowers et al. | July 25, 1950 |